United States Patent [19]

Bloom

[11] 4,110,355
[45] Aug. 29, 1978

[54] ANTHRAQUINONE COMPOUNDS USEFUL IN PHOTOGRAPHIC PROCESSES

[75] Inventor: Stanley M. Bloom, Waban, Mass.

[73] Assignee: Polaroid Corporation, Cambridge, Mass.

[21] Appl. No.: 363,354

[22] Filed: May 23, 1973

Related U.S. Application Data

[60] Continuation-in-part of Ser. No. 318,227, Dec. 26, 1972, abandoned, which is a division of Ser. No. 655,338, Jul. 24, 1967, Pat. No. 3,751,406.

[51] Int. Cl.$^2$ ............................................. C09B 1/50
[52] U.S. Cl. ............................ 260/372; 96/91 R; 96/29 R; 260/147; 260/152; 260/163; 260/174; 260/177; 260/178; 260/180; 260/181; 260/184; 260/185; 260/187; 260/188; 260/194; 260/195; 260/196; 260/197; 260/199; 260/201; 260/202; 260/203; 260/207; 260/207.1; 260/347.91; 260/373; 260/374; 260/377; 260/519; 260/559 R; 260/559 A; 260/561 R

[58] Field of Search .............. 260/374, 370, 371, 373, 260/372, 377

[56] References Cited

U.S. PATENT DOCUMENTS

| 2,063,246 | 12/1936 | Haddock | 260/377 |
| 3,070,602 | 12/1962 | Buebler | 260/371 |
| 3,252,969 | 5/1966 | Blout | 260/373 |
| 3,418,064 | 12/1968 | Buecheler | 260/377 |
| 3,533,788 | 10/1970 | Coles | 260/377 |
| 3,772,362 | 11/1973 | Weaver | 260/377 |
| 3,842,101 | 10/1974 | Graser | 260/377 |
| 3,925,347 | 12/1975 | Huyffer | 260/377 |

Primary Examiner—James O. Thomas, Jr.
Assistant Examiner—Michael Shippen
Attorney, Agent, or Firm—John P. Morley

[57] ABSTRACT

This invention relates to a novel class of compounds which are capable of reacting in such a way as to form a new heterocyclic ring, and as a function of such reaction and ring formation to split off a color-providing material.

11 Claims, No Drawings

ANTHRAQUINONE COMPOUNDS USEFUL IN PHOTOGRAPHIC PROCESSES

CROSS REFERENCE TO RELATED APPLICATIONS

This application is a continuation-in-part of application Ser. No. 318,227 filed Dec. 26, 1972, now abandoned, which is a Division of U.S. Patent application Ser. No. 655,338 filed July 24, 1967 which is now U.S. Pat. No. 3,751,406.

BACKGROUND OF THE INVENTION

The copending application of Stanley M. Bloom and Howard G. Rogers, now U.S. Pat. No. 3,443,940, filed concurrently, relates to novel photographic systems for preparing color images. In these systems, a photosensitive element including at least one light-sensitive silver halide emulsion is developed in the presence of a compound which is immobile and non-diffusible in the processing fluid, but which, upon development, undergoes a ring-closing reaction to split off a mobile and diffusible color-providing material. Color image formation is predicated upon the resulting differential in diffusibility, whereby an imagewise distribution of the more diffusible color-providing material split off as a function of development may be transferred to an image-receiving layer, e.g., a dyeable stratum of the character heretofore known in the art, to provide a color transfer image thereon.

The present invention relates to novel compounds which may be employed in the various photographic products and processes described and claimed in this copending application.

SUMMARY

These compounds may be defined as being compounds which are immobile and non-diffusible in an aqueous alkaline processing medium and where are capable of reacting with an oxidized silver halide developing agent of the type known as "color developers" or which are capable of providing an oxidation product which may auto-react intramolecularly in such a way as to form a new heterocyclic ring, and as a function of such reaction and ring formation to split off a mobile and diffusible color-providing material.

They may also be defined as being within one of the following groups of compounds:

(1) relatively immobile and non-diffusible compounds capable of coupling with the oxidation product of an aromatic primary amino color developer during development of an exposed silver halide emulsion with subsequent ring closure to produce a new heterocyclic ring and as a function of such reaction to split off a mobile and diffusible color-providing material; or (2) relatively immobile and non-diffusible silver halide developing agents which are capable of providing, upon development of an exposed silver halide emulsion, an oxidation product which can auto-react intramolecularly to form a new heterocyclic ring and as a function of such reaction to split off a mobile and diffusible color-providing material.

As was mentioned previously, this invention is directed to novel compounds including a color-providing moiety and which are of particular use in the photographic systems described and claimed in the aforementioned copending application now U.S. Pat. No. 3,443,940

A primary object of this invention, therefore, is to provide a novel class of compounds of the foregoing description and methods for preparing the same.

Another object is to provide a novel class of compounds which are partiicularly useful in color photography.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description.

The novel compounds of this invention may be represented by the following formula:

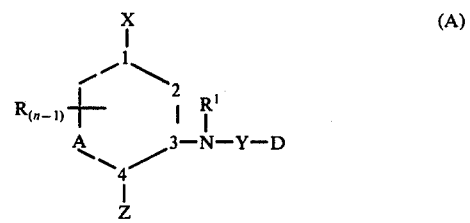

wherein:

A represents the atoms necessary to complete an aromatic ring, e.g., a benzene or naphthalene nucleus, which nucleus may be further substituted;

d is a color-providing moiety, e.g., a complete dye such as a monoazo, disazo or anthraquinone dye, which may, if desired, be metallized in known manner;

Z may be hydrogen, any of the substituents heretofore known in the art which are replaceable by oxidized aromatic amino color developer in so-called elimination-coupling reactions (see, for example, Mees, "The Theory of the Photographic Process", Revised Edition, 1954, pp. 599-601), e.g., chloro, bromo, carboxy, sulfo, hydroxy, alkoxy, hydroxyalkyl, etc.; or an aromatic amino radical, e.g., an anilino substituent, including substituted anilino radicals, particularly of the p-hydroxy-anilino series or the substituted anilino radical of a color developer of the p-phenylene diamine series, e.g.,

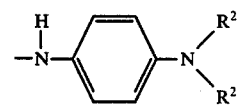

wherein:

each $R^2$ is hydrogen or a lower alkyl radical, and including the known substituted derivatives of the aforementioned anilino radicals having a free position ortho to the —NH— substituent, a para-amino or a parahydroxy-naphthylamino radical, including substituted derivatives thereof having a free position ortho to the —NH— substituent, which derivatives may contain an anchoring moiety to be described with more particularity hereinafter;

Y is any substituent which completes or forms an amide with, and reduces the basic character of the amino group in the 3-position, such as the residue of an acid, linking the color-providing moiety D to the 3- nitrogen atom, and which is capable of being eliminated during the ring formation to be described with more particularity hereinafter, e.g.,

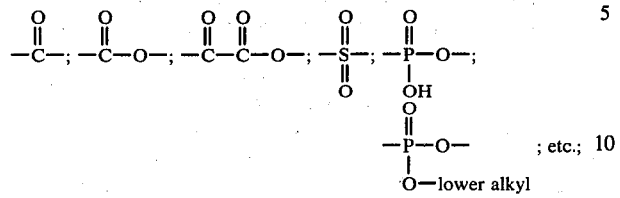

X is hydroxy or amino, e.g., a primary, secondary or tertiary amino substituent of the formula:

wherein:

each $R^3$ may be hydrogen, a hydrocarbon radical, e.g., alkyl, such as methyl, ethyl, butyl, dodecyl, etc., aryl such as phenyl or naphthyl attached through a carbon atom thereof to the nitrogen atom, a cyclic alkyl such as cyclopentyl or cyclohexyl, i.e., where both $R^3$'s are alkylene comprising together with the nitrogen atom a heterocyclic ring, a substituted alkyl, such as hydroxyethyl, methoxyethoxyethyl, polyglycoloxyethyl, carboxymethyl, carboxyethyl, ethyl-carboxymethyl, benzyl, phenylethyl, sulfo-phenylethyl, acetylaminophenylethyl, succinylaminophenylethyl, furanemethyl, etc.; or a substituted aryl such as methylphenyl, ethylphenyl, etc.; or when Z is one of the described anilino or naphthylamino radicals containing a para-amino or para-hydroxy substituent, X may be hydrogen or the substituent R;

R is an "anchoring" or immobilizing substituent rendering the compound non-diffusible, e.g., higher alkyl such as decyl, dodecyl, stearyl, oleyl, etc. linked directly to the aromatic nucleus or linked indirectly thereto through an appropriate linking group, e.g., —CONH—, —alkylene—CONH—,

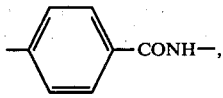

etc., an aromatic ring, e.g., of the benzene or naphthalene series, or a heterocyclic ring, which rings may be either bonded to a single carbon atom of the aromatic nucleus or fused thereto, i.e., bonded to a pair of adjacent carbon atoms, or R may be a plurality of short chain radicals which together provide the anchoring moiety, each of said short chain radicals being linked directly or indirectly to a different carbon atom of the aromatic nucleus formed by the A moiety;

$R^1$ is hydrogen, an alkyl such as methyl, ethyl, propyl, butyl, hexyl, octyl, dodecyl, cyclohexyl, etc.; or a substituted alkyl, e.g., a hydroxyalkyl, such as 2-hydroxyethyl, 3-dihydroxypropyl, etc., carboxyalkyl such as carboxymethyl, carboxyethyl, carboxybutyl, carboxydecyl, etc., hydroxyethyl-ether, polyglycoloxyethyl, furanemethyl, benzyl, phenylethyl, carboxyphenylethyl, sulfo-phenylethyl, acylamino-phenylethyl, etc.;

and n is a positive integer from 1 to 2, provided that when $R^1$ or $R^3$ alone or together comprise one of those named substituents rendering the compound non-diffusible, i.e., an "anchoring" substituent, and/or when Z comprises an aromatic nucleus contributing an anchoring moiety alone or in conjunction with said $R^1$ and/or $R^3$ moieties, n may be 1, but when $R^1$, $R^3$ or Z alone or together do not provide such a substituent, n must be 2.

The various substituents described above which may provide the R, $R^1$, $R^2$, $R^3$, Z and/or Y moieties and illustrative compounds containing the same are disclosed, for example, in one or more of the following U.S. patents: Nos. 2,414,491; 2,486,440; 2,522,802; 2,536,010; 2,543,338; 3,227,550; 3,227,551; 3,227,552; 3,227,554; 3,243,294; and 3,245,795.

As was mentioned previously, Z may be a substituted anilino radical of a color developer of the p-phenylene diamine series. As examples of color developers of this series which may contribute the aforementioned radical, mention may be made of the following:

N,N-diethyl-p-phenylenediamine,
2,-amino-5-diethylamino toluene,
N-ethyl-β-methanesulfonamido-ethyl-3-methyl-4-amino-aniline,
4-amino-N-ethyl-3-methyl-N-(β-sulfoethyl)aniline,
4-amino-N-ethyl-3-methoxy-N-(β-sulfoethyl)aniline,
4-amino-N-ethyl-N-(β-hydroxyethyl)aniline,
4-amino-N,N-diethyl-3-hydroxymethyl aniline,
4-amino-N-methyl-N-(β-carboxyethyl)aniline,
4-amino-N,N-bis(β-hyroxyethyl)aniline,
4-amino-N,N-bis(β-hydroxyethyl)-3-3-methyl aniline,
3-acetamido-4-amino-N,N-bis(β-hydroxyethyl)aniline,
4-amino-N-ethyl-N-(2,3-dihydroxypropyl)-3-methyl aniline sulfate salt
4-amino-N,N-diethyl-3-(3-hydroxypropoxy)aniline,
and the like.

Also as was mentioned previously, the colorproviding moiety D is not restricted to complete dyes and is intended to include within its scope materials which are initially colorless or of a color other than that ultimately desired in a particular environment, but which provide the desired color during or subsequent to use in the aforementioned photographic procedures, e.g., upon a change in environment and/or upon subsequent chemical reaction. This change of environment may, for example, be a change in pH, e.g., to an acid environment. Color-providing materials of this nature include indicator dyes, leuco dyes and carbonyls of basic dyes. Also included within the scope of this invention are incomplete dyes or color formers which may react with another substance to form a dye image. However, an incomplete dye or a color former of this description must not be reactable with the oxidized color developer so as to preclude ring-closure and release of the diffusible color-providing moiety.

In general, compounds within the scope of formula A may be readily synthesized by appropriate reaction between an acid salt of the desired dye and the 3-amino substituent of the aromatic ring, as follows:

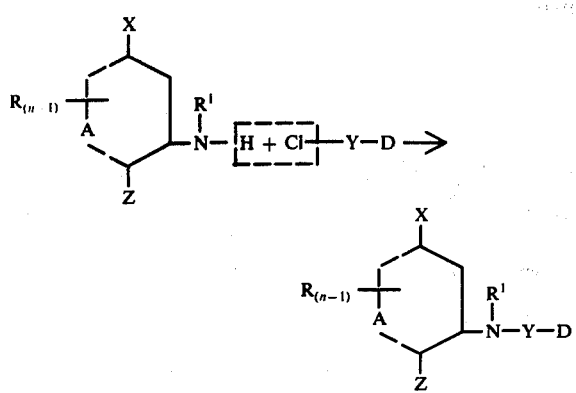

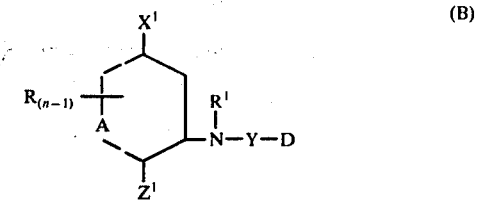

(B)

wherein A, R, $R^1$, n, Y and D have the meanings heretofore noted;

$X^1$ is hydroxy or an amino substituent as heretofore noted in connection with the description of the X moiety; and $Z^1$ is hydrogen or any of the substituents such as heretofore mentioned which are replaceable by oxidized aromatic amino color developer to effect ring-closure in a manner similar to that described in certain of the aforementioned patents and in the aforementioned copending application Ser. No. 655,440 filed July 24, 1967 now U.S. Pat. No. 3,443,940.

As examples of useful compounds within the scope of formula (B), mention may be made of the following:

Where X is amino, it may be necessary or desirable to employ the corresponding 1-nitro analogues in the aforementioned reaction, followed by reduction, e.g., with hydrogen in the presence of a Raney nickel catalyst, to form a 1-amino compound within the scope of formula A. It may also be desirable, in some instances, to have the 1-amino substituent protected during reaction, e.g., by an appropriate blocking group, to insure reaction between the acid salt and the 3-amino substituent.

The compounds wherein Z is a coupling position may be represented by the following formula:

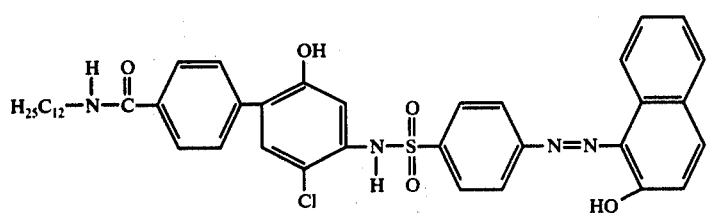
(1)

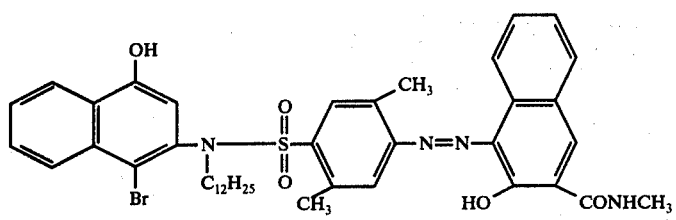
(2)

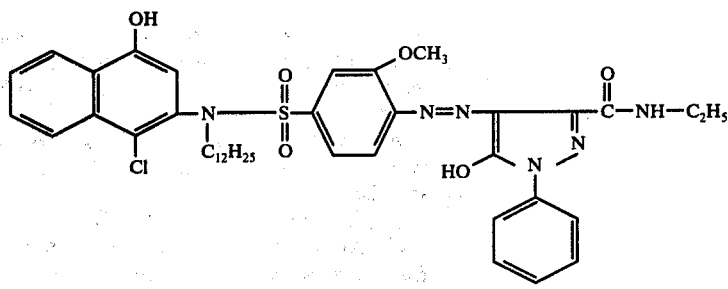
(3)

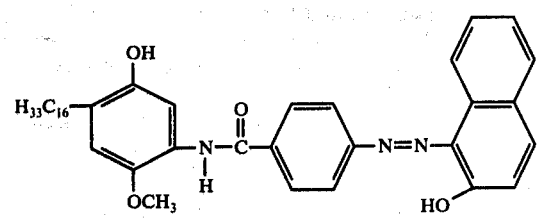
(4)

-continued

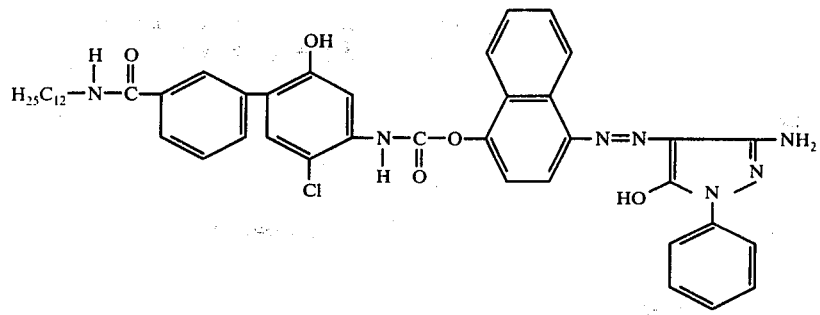

(5)

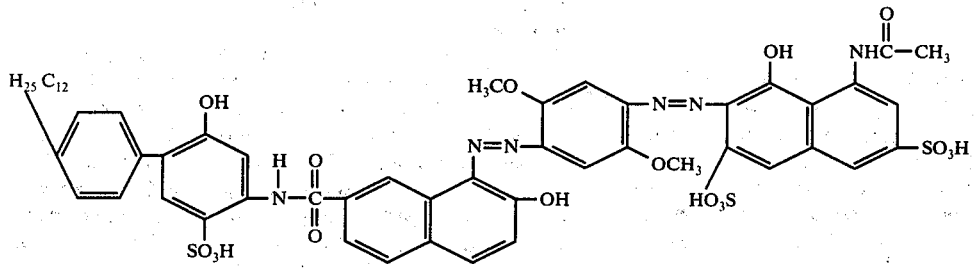

(6)

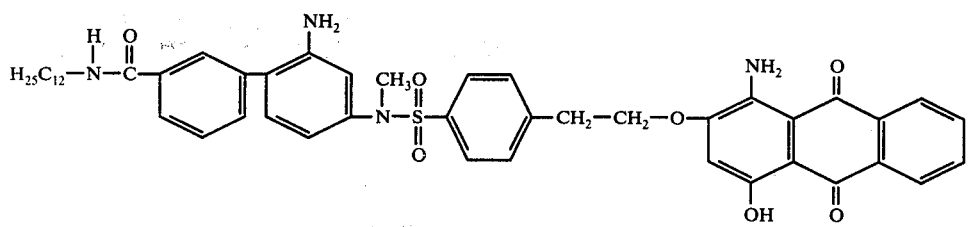

(7)

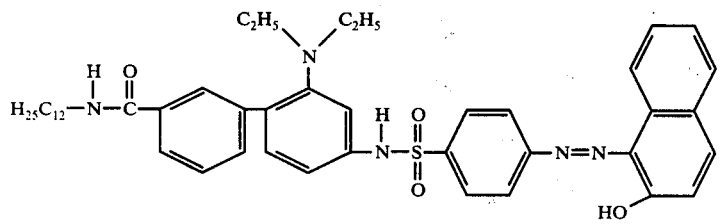

(8)

The compounds of Formula A wherein Z is an aromatic amino substituent may be represented by the following formula:

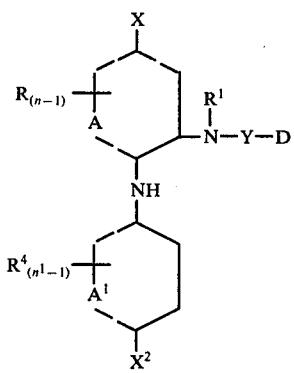

(C)

wherein:

$X^2$ is hydrogen, hydroxy, an amino group of the formula:

such as may be contained by said X moiety, as previously described, or the substituent $R^4$, provided that at least one of said X and $X^2$ moieties must be hydroxy or amino;

$A^1$ represents the atoms necessary to complete a benzene or naphthalene ring, which ring may be further substituted;

$R^4$ has the same meaning as R;

$n^1$, like $n$ is a positive integer from 1 to 2, provided that when $R^1$ or $R^3$ alone or together comprise one of those heretofore named substituents rendering the compound non-diffusible, either or both $n$ and $n^1$ may be 1, but when $R^1$ and $R^3$ alone or together do not provide such an anchoring moiety, at least one of $n$ and $n^1$ must be 2.

The compounds of formula (C) may be prepared by coupling a dye of the formula:

(D) Cl—Y—D with a compound of the formula:

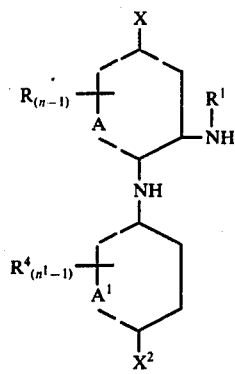
(E)

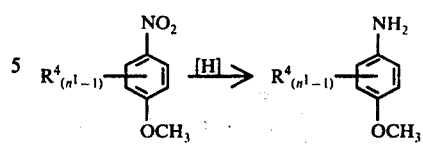
(I)

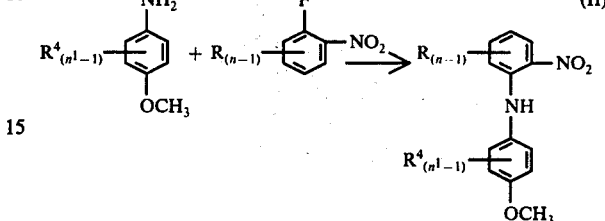
(II)

Where X and/or X² is hydroxy, it may be necessary or advisable for the hydroxy moiety to be present as a protected derivative, e.g., as an alkoxy substituent, during coupling, in which event the desired hydroxy analogue may subsequently be obtained by hydrolysis.

The preferred compounds of formula (C) may be represented by the formula:

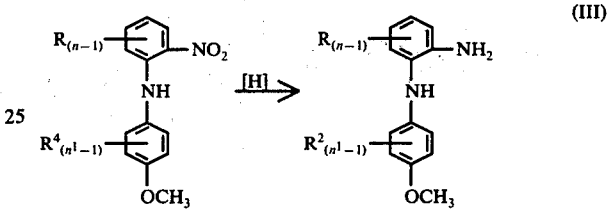
(III)

(F)

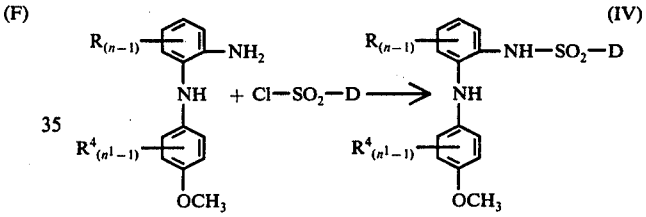
(IV)

wherein the anchoring moiety R or R⁴ comprises a long chain amide, e.g., of at least 13 carbon atoms, said amide being bonded directly to a nuclear carbon atom of the designated benzene moity or being linked thereto through a phenylene or alkylene linking substituent; and nuclear substituted derivatives thereof, e.g., where any of the nuclear carbon atoms of the respective benzene moieties not containing one of the specifically designated substituents may contain a carboxy, alkyl, alkoxy, amino, chloro, hydroxyl, or amide substituent, etc.

The preferred subclass of formula (F) may be prepared by coupling in the manner described with regard to the broader class of formula (C) followed by dealkylation of the protected hydroxy group. Where the starting materials are not readily available, they may be prepared by the steps set forth in the following sequence of reaction steps:

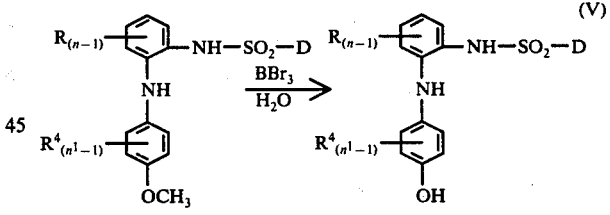
(V)

Formula F

They may also be prepared by coupling of any of the protected derivatives of the known p-aminophenol developers, with an ortho-fluoro-nitrobenzene, followed by reduction of the nitro group, coupling of the dye-containing moiety D—SO₂—Cl, and hydrolysis in the aforementioned manner, according to the procedure described and claimed in the copending application of Harris L. Curtis, Ser. No. 655,304 filed July 24, 1967 and now abandoned.

As examples of useful compounds contemplated by formula (C) mention may be made of the following:

(9)
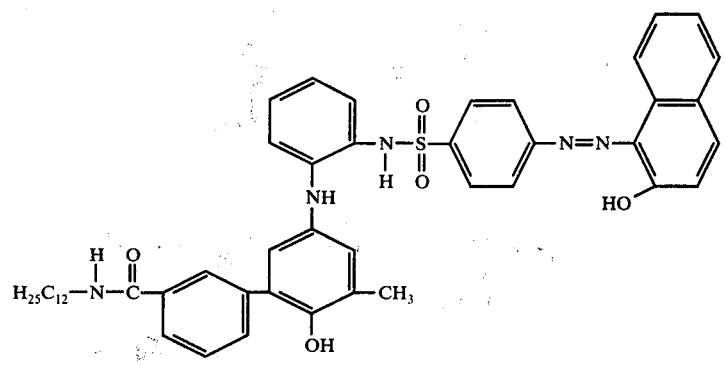
(10)
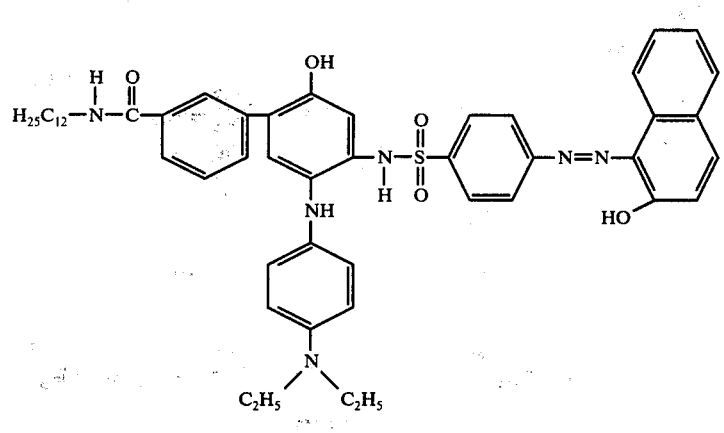
(11)
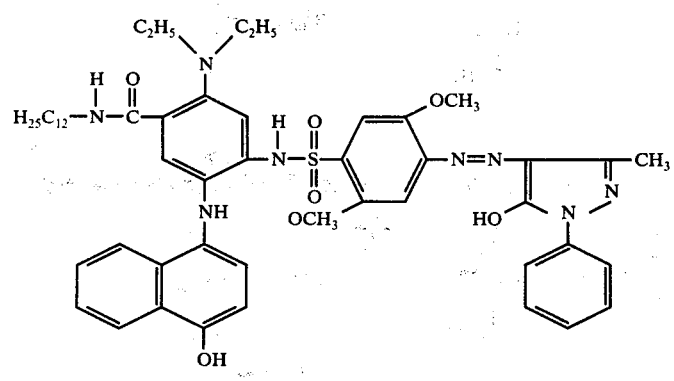
(12)
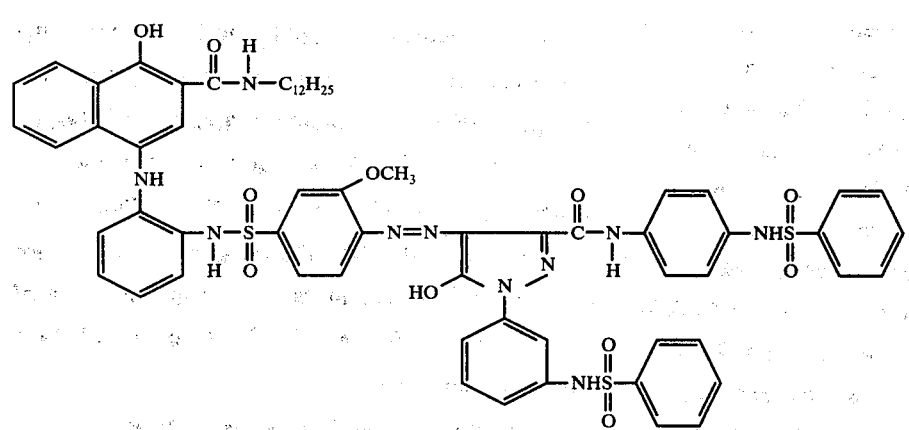

(13)
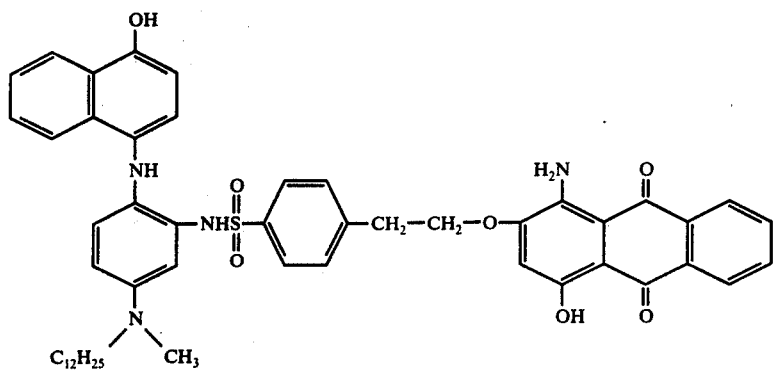
(14)
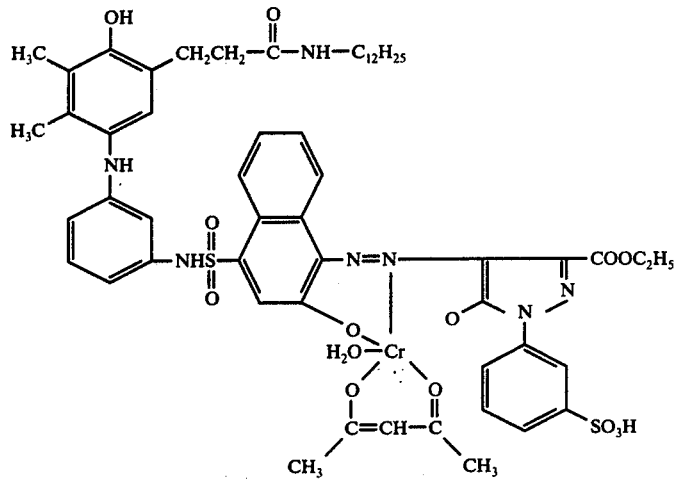
(15)
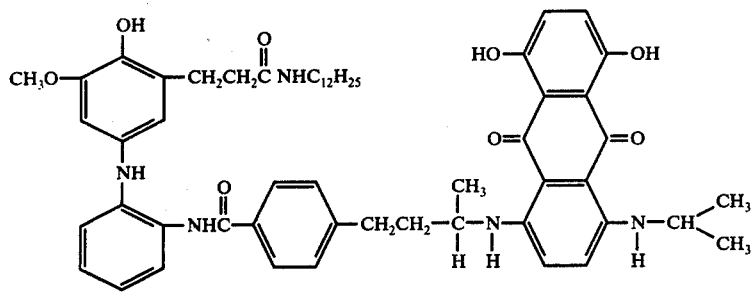
(16)
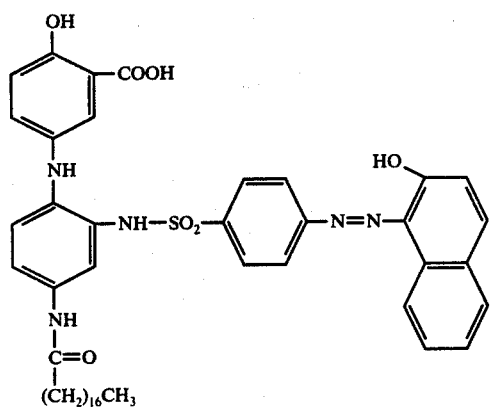

-continued
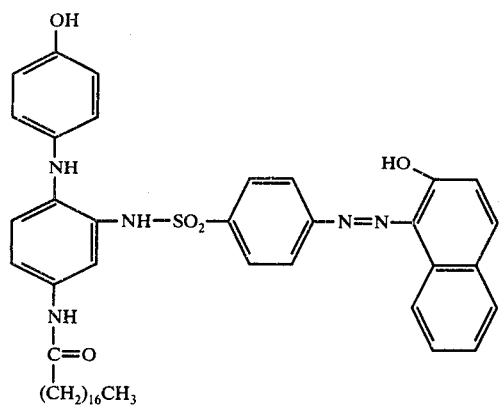
(17)
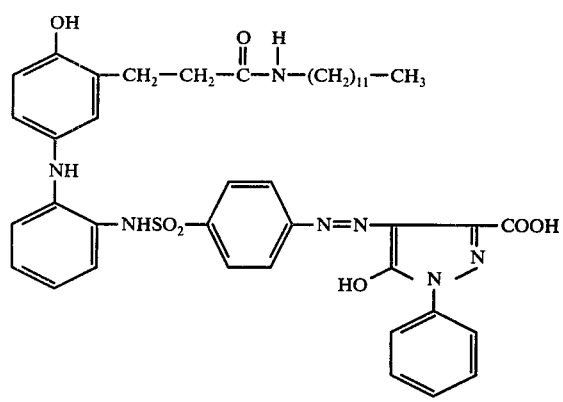
(18)
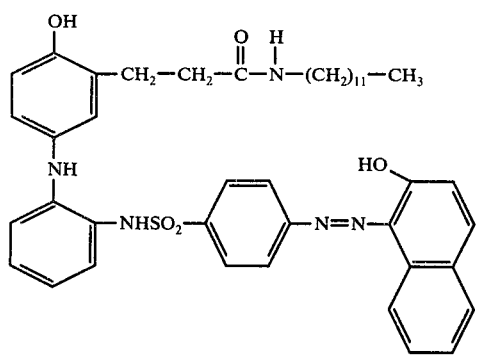
(19)
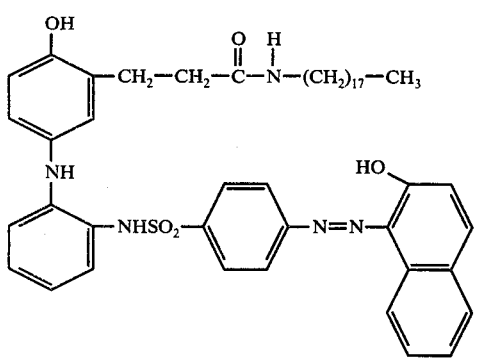
(20)

-continued
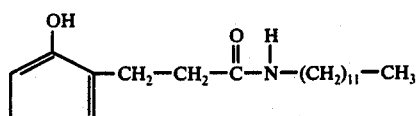 (21)
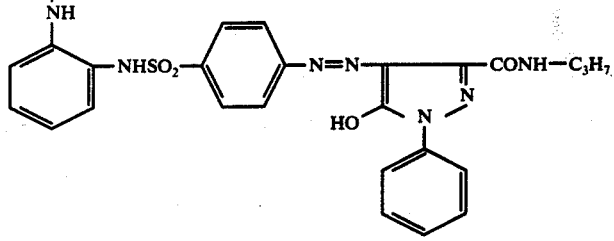
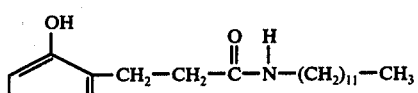 (22)
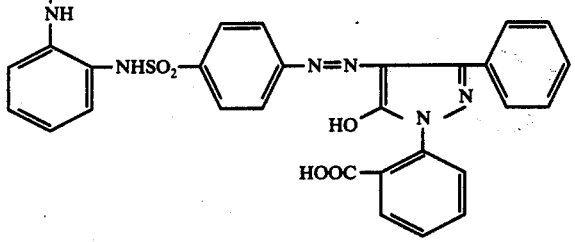
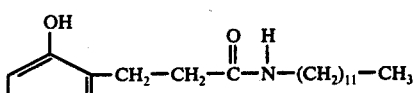 (23)
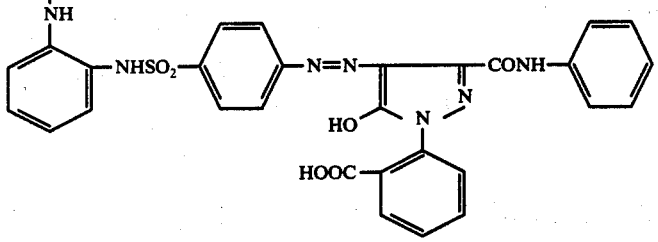
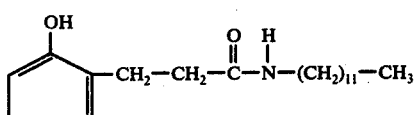 (24)
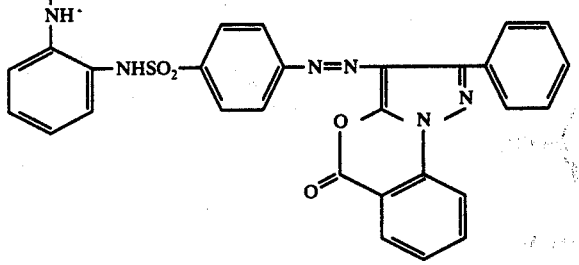

-continued
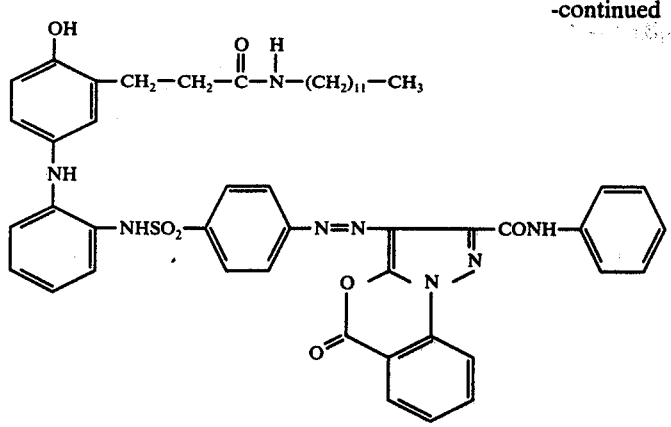 (25)
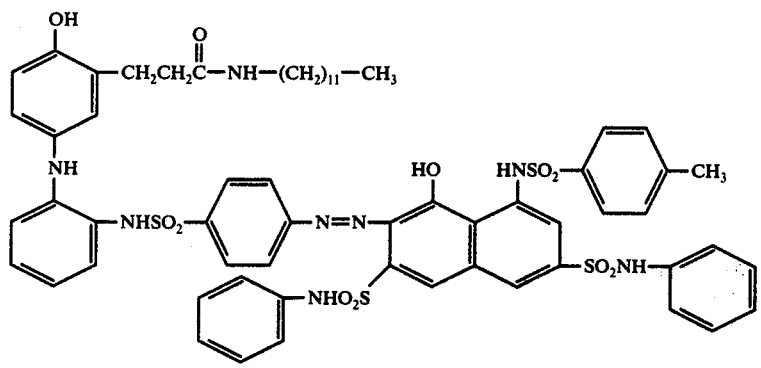 (26)
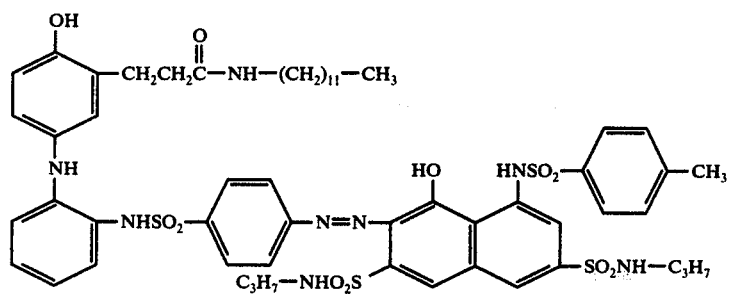 (27)
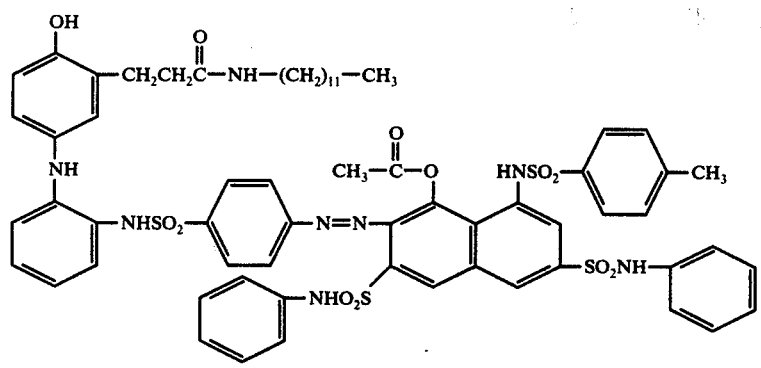 (28)
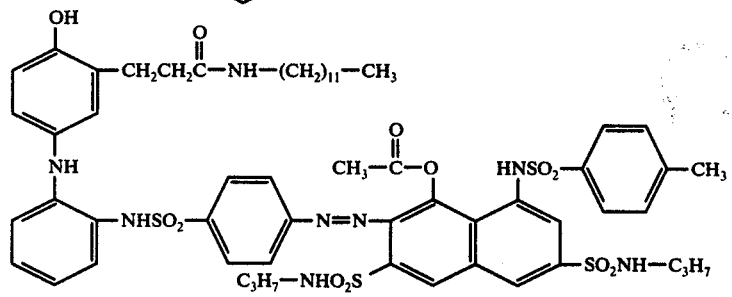 (29)

(30)

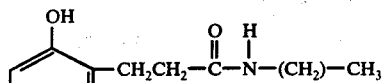
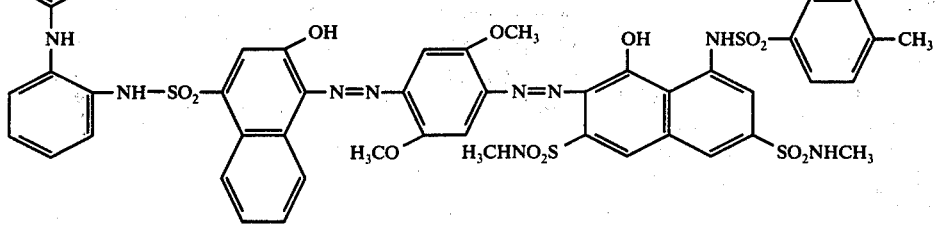

(31)

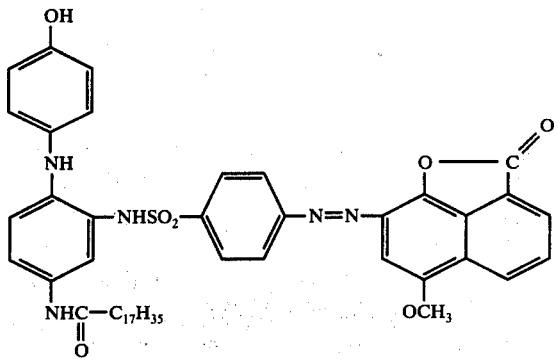

Compounds 24 and 25 contain a color-shifted yellow dye moiety; and compounds 28, 29, and 31 contain a color-shifted magenta dye moiety. These compounds are initially substantially colorless but upon hydrolysis, e.g., in an alkaline photographic processing fluid, provide the desired color. Color-shifted yellow dyes and magenta dyes and their advantages in photography are described with more particularity in U.S. Pat. Nos. 3,230,085 and 3,307,947, respectively.

The following examples shows by way of illustration and not by way of limitation the preparation of the novel compounds of this invention.

EXAMPLE 1

500 g. of methyl p-amino-benzoate were added to 1,250 ml. of acetic anhydride with stirring, while maintaining the temperatue of the mixture between 50° and 60° C. After addition was complete, the mixture was chilled. A white solid, which precipitated, was removed by suction filtration and air-dried under a hood. 509.7 g. (79.8%) of 4-carbon-methoxyacetanilide (m.p. 131°-133° C.) were obtained. A mixture of 315.8 g. (1.63 moles) of this compound, 1,250 ml. of glacial acetic acid, and 600 ml. of acetic anhydride was stirred with external cooling until the temperature dropped to about 2° C. Nitrous fumes, prepared from 500 g. of sodium nitrite and 500 ml. of nitric acid (sp. gv. 1.42), were bubbled into the mixture for two hours, after which time the resulting dark green, clear solution was stirred into 5 l. of crushed ice. A light yellow precipitate was removed by suction filtration, washed thoroughly with water, pressed between filter papers, and then dried in vacuo over anhydrous calcium chloride to yield 250.2 g. (68.8%) of 4-carbo-methoxy-N-nitrosoacetanilide. Over a period of two hours with vigorous stirring, 250.2 g. (1.13 moles) of this compound were added to 560 g. (2.98 moles) of molten 4-chloro-3-nitroanisole. The temperature of the mixture was kept between 50° and 60° C. during the addition. Stirring was continued for an additional 15 minutes, after which the excess anisole was removed by steam distillation. The resulting dark brown residue was triturated with 1,500 ml. of ether. The ether-insoluble solid was removed by suction filtration and washed with small portions of ether. One recrystallization of this solid from ethanol yielded 18.5 g. (5.8%) of (2-methoxy-4-nitro-5-chloro-4'-carbomethoxy)diphenyl, m.p. 189°-191° C., having the following structural formula:

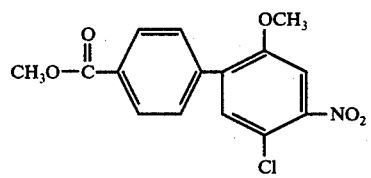

To 14.2 g. (0.466 m.) of this compound in 400 ml. of methylene chloride, 75 ml. of boron tribromide were carefully added. The resulting dark red solution was allowed to stand overnight at room temperature and then treated dropwise with anhydrous methanol until further addition of methanol no longer produced an exothermic reaction. After treatment with water, the mixture was extracted with ether, the ether layer extracted with cold 1% sodium hydroxide solution, the alkaline solution was filtered and acidified with hydrochloric acid. The resulting cream-colored solid was filtered, washed with water and dried. 12 g. of (2-hydroxy-4-nitro-5-chloro-4'-carbomethoxy)diphenyl were obtained. [This product was found to contain free acid, n.p. soft 238° C., m. 250°-253° C. dec. A small amount of ester was purified by extraction with sodium bicarbonate solution followed by recrystallization from methanol, m.p. 235°-237° C.] A mixture of 12 g. of the diphenyl prepared above, 250 ml. of ethanol and 75 ml. of 10% sodium hydroxide solution was heated on the steam bath for 30 minutes. The resulting red solution was filtered, acidified with hydrochloric acid, filtered, washed and dried to yield 11.4 g. of (2-hydroxy-4-nitro-5-chloro-4'-carboxy)diphenyl, m.p. 251°–252° C. 4 g. of this compound, 40 ml. of acetic anhydride and 1 ml. of pyridine were heated on a steam bath for five hours. The resulting solution was evaporated to dryness and the residue recrystallized from ethyl acetate-hexane to yield 4.5 g. of (2-acetoxy-4-nitro-5-chloro-4'-carboxy)-diphenyl, m.p. 211.5°–213.5° C. A mixture of 4.5 g. of this compound and thionyl chloride was refluxed for one hour. The excess thionyl chloride was then allowed to distill at atmospheric pressure over 30 minutes and the residue was evaporated at 40° C. at water-pump pressure. The yellow solid acid chloride was directly dissolved in 250 ml. of dry benzene and added dropwise with stirring to a solution of 6 g. of dodecylamine hydrochloride in 25 ml. of triethylamine at ice bath temperature. The mixture was allowed to stir overnight at room temperature, after which it was poured into dilute hydrochloric acid solution and extracted with methylene chloride. The organic layer was washed three times with dilute hydrochloric acid solution, then with water until the aqueous layer was neutral to pH paper. The methylene chloride solution was dried over anhydrous magnesium sulfate, filtered and evaporated to dryness to yield a brown oil. The brown oil was chromatographed on Florisil using ether-hexane and the product was present in the first yellow band which eluted. Partial evaporation of the ether solvent and addition of hexane produced waxy yellow flakes. A recrystallization from ether-hexane and another from methylene chloride-carbon tetrachloride produced 2.8 g. (in two crops) of (2-hydroxy-4-nitro-5-chloro-4'-carbo-n-dodecylamide)diphenyl, m.p. 145°–148° C., having the following structural formula:

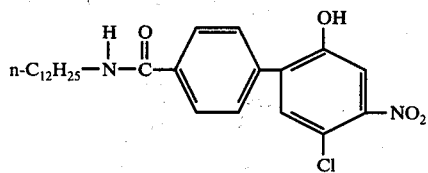

A mixture of 2.76 g. of this compound, 150 ml. of anhydrous ethanol, 1 ml. of concentrated hydrochloric acid and about 2 g. of 5% palladium on carbon was hydrogenated at room temperature at an initial pressure of 40 lbs. per square inch. Reduction required about one hour. The mixture was then filtered, the residue washed with anhydrous ethanol and the filtrate evaporated to a low volume. Anhydrous ether was added to the colorless solution and upon cooling, 2.7 g. of (2-hydroxy-4-amino-hydrochloride-5-chloro-4'-carbon-n-dodecylamide)diphenyl was obtained, m.p. 207°–215° C. dec. A mixture of 1 g. of this compound and 1.4 g. of 4-(2-naphthol-1-azo) benzene sulfonyl chloride in 50 ml. of pyridine was stirred at room temperature for three hours at which time complete solution was obtained. The solution was allowed to stand at room temperature overnight, poured into ice-water and filtered. After work-up of the mother liquor and recrystallization from glacial acetic acid, 1.2 g. of the compound of formula 1 was obtained, m.p. 229°–232° C. $\lambda_{max.} = 482; \epsilon = 23,400$ in methyl cellosolve.

EXAMPLE 2

11.0 g. (0.05 mole) of 6-nitrodehydrocoumarin was dissolved in 100.0 cc. of methyl cellosolve. 12.0 g. (0.064 mole) of n-dodecylamine was then added. [The reaction was exothermic and a yellow solid separated out.] The mixture was heated until a clear solution was obtained and then cooled to give 14.0 g. of light yellow crystals, m.p. 168°–170°, an amide of the formula:

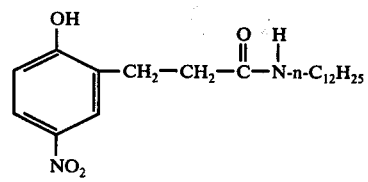

A mixture of 16.5 g. (0.0437 mole) of this amide, prepared in the manner described above, 7.0 g. (0.056 mole) of dimethylsulfate, 9.2 g. (0.066 mole) of potassium carbonate and 250 ml. of xylene was refluxed overnight. The xylene was then removed by steam distillation and an oily product crystallized on standing. Recrystallization of this product from hexane-chloroform yielded 13.3 g. of light tan needles, m.p. 106°–108° C. of the formula:

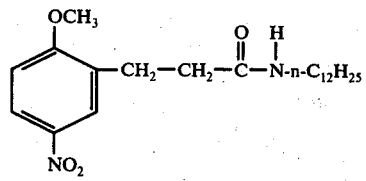

13.3 g. of this latter amide was hydrogenated in 95% ethanol in the presence of a Raney-Nickel catalyst. The reaction mixture was filtered and the filtrate evaporated. The resulting solid was recrystallized from hexane-ether to obtain 9 g. of a pure white amine, m.p. 80°–82° C. of the formula:

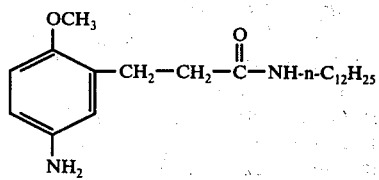

52 g. (0.145 mole) of the amine prepared in the above manner, 21.0 g. (0.145 mole) of 2-fluoronitrobenzene, 7.85 g. (0.195 mole) of magnesium oxide and 100.0 ml. of water were heated in a sealed bomb at 180° C. for 18 hours. The contents of the bomb were then filtered and the solid obtained by filtering was stirred in boiling ethyl acetate and filtered. Cooling of the filtrate yielded 40 g. of a light yellow solid, m.p. 125°–126° C., of the formula:

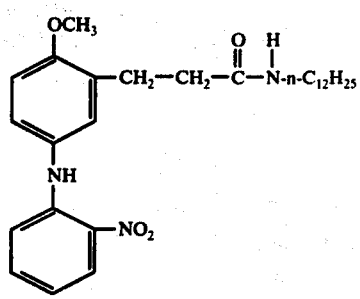

10.0 g. of the last-named product was hydrogenated with 5% Pd/BaSO₄ in ethyl acetate to reduce the nitro group to the corresponding amine. The reaction mixture was filtered and the filtrate was then cooled in dry ice. Filtration yielded 9 g. of an off-white solid, m.p. 81°–83° C., an amine of the formula:

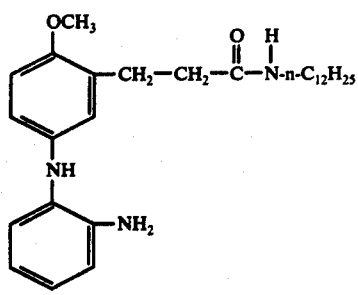

4.54 g. (0.01 mole) of this amine and 3.5 g. (0.1 mole) of the sulfonyl chloride or Orange II, a dye of the formula:

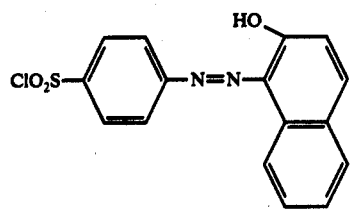

were allowed to stand overnight at room temperature in 100 ml. of pyridine. The reaction mixture was then heated on the steam bath for 30 minutes, allowed to cool and poured into 500 ml. of 10% HCl and 50 g. of ice. The resulting solid was filtered and recrystallized from ethyl acetatemethanol to yield 3.6 g. of an orange solid, m.p. 191°–193° C. of the formula:

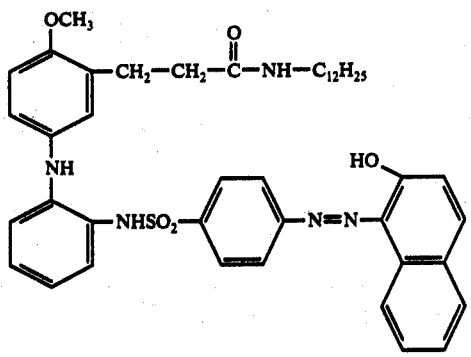

2.6 g. (0.0034 mole) of this solid in 50 ml. of methylene chloride was reacted with a large excess of boron tribromide in methylene chloride and the reaction mixture was allowed to stand at room temperature overnight. Water was cautiously added and when the reaction was complete, the mixture was stirred for one hour while bubbling nitrogen through the solution. The resulting orange solid was collected by filtration and crystallized from methanol to yield 2.6 g. of the compound, m.p. 150°–151° C. of formula 19.

EXAMPLE 3

The procedure of Example 2 was repeated, substituting n-C₁₈H₃₇NH₂ for the dodecylamine to obtain the compound of formula 20.

EXAMPLE 4

15. g. of sodium carbonate was dissolved in 500 ml. of water. 57.3 g. of sulfanilic acid monohydrate was then slowly added. After all of this acid was dissolved, the resulting solution was cooled to 0° C. and 22.5 g. of sodium nitrite was added. After the sodium nitrite had dissolved, the resulting solution was poured into a mixture of 60.0 ml. of 37% HCl and 300 g. of ice to form a diazonium salt of the formula:

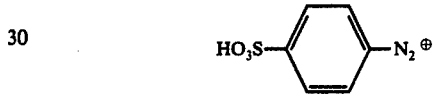

After formation of this diazonium salt, the reaction mixture was poured into a water-acetone solution of 15.9 g. of sodium carbonate and 69.6 g. of:

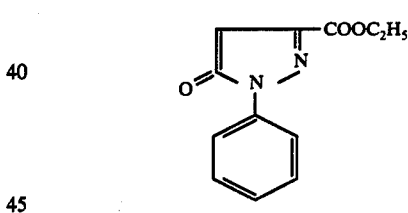

1-phenyl-3-carbethoxy-pyrazolone-5.

The resulting mixture was allowed to stand for several hours, and then filtered to yield 125 g. of:

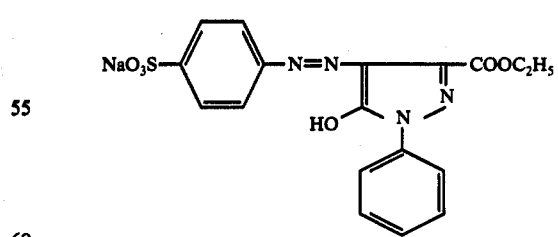

To a stirred slurry of 20 g. of this last-named compound in 50 ml. of water, was added 20.0 ml. of n-propylamine. The resulting mixture was refluxed with stirring overnight. Excess propylamine was boiled off and the remaining mixture was poured into 20% NCl. After filtration and recrystallization, 15.5 g. of the corresponding amide was obtained, m.p. 272°–274° C. of the formula:

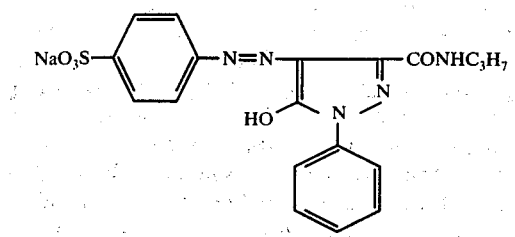

10.4 g. of this amide, 50.0 ml. of chlorobenzene, 5.0 ml. of thionyl chloride and 4.0 ml. of N,N-dimethylformamide were heated on a steam bath for one hour. The solvent was then removed by evaporation with a stream of nitrogen and the resulting mixture was triturated with hexane-benzene. Filtration and recrystallization from benzene yielded 4 g. of a compound, m.p. 185°–187° C. of the formula:

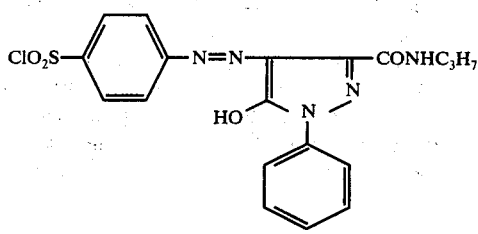

3.4 g. of this compound and 3.4 g. of an amine of the formula:

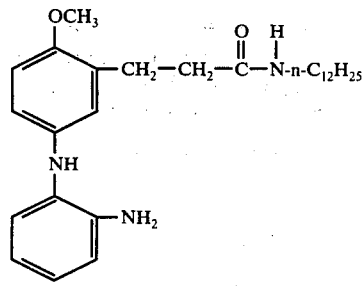

(prepared in the manner described in Example 2) were refluxed overnight in 50 ml. of dry benzene. The mixture was then cooled and the resulting solid collected and crystallized from benzene to yield 4 g. of a compound, m.p. 133°–135° C. of the formula:

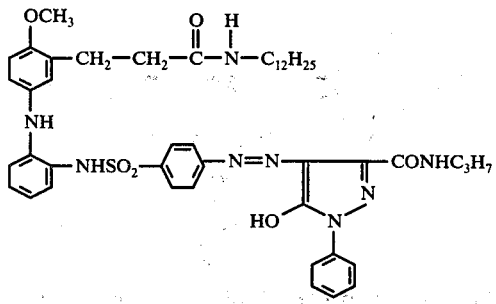

4.0 g. of this last-named compound in 50 ml. of dichloromethane was reacted with a large excess of boron tribromide and the reaction mixture was then allowed to stand overnight at room temperature. Water was added to "destroy" excess boron tribromide and the mixture when then stirred under nitrogen for one hour and filtered. The resulting solid residue was stirred in hot water and filtered. Recrystallization from benzene-hexane yielded 2.0 g. of the compound of formula 21, yellow crystals, m.p. 138°–140° C.

EXAMPLE 5

Fifteen grams of 4-fluoro-5-nitro-aniline, 35.0 grams of stearoyl chloride and 8.4 g. of sodium bicarbonate were stirred overnight at room temperature. The reaction mixture was then refluxed and the insoluble inorganic salts were filtered off. Upon cooling of the filtrate, an off-white solid was obtained, m.p. 82°–83° C., having the formula:

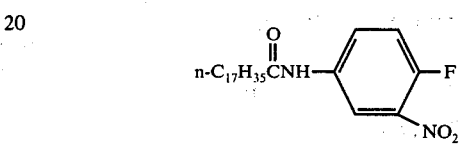

Thirty grams of 3-carboxy-4-methoxy-aniline was added to 75.0 g. of the 5-stearamido-2-fluoro-nitrobenzene (prepared above) and 45.0 g. of potassium acetate in 225 ml. of dimethyl sulfoxide. The resulting mixture was stirred over a weekend under a flow of nitrogen while maintaining the temperature at about 100° C. It was then poured into a large amount of cold water and the resulting precipitate was filtered, washed with water and a small amount of ethanol. This crude product was then recrystallized from acetic acid to yield 36 g. of a yellow solid, m.p. 186°–187° C., of the formula:

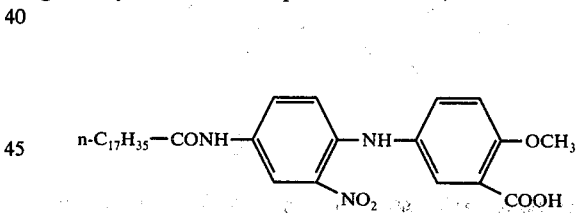

Four grams of the last-mentioned compound was hydrogenated in ethanol with a Pd/BaSO₄ catalyst to reduce the nitro group to an amino substituent. Following hydrogenation for about two hours, the product was filtered and quickly cooled to obtain 3 g. of the amine, a nearly white solid, m.p. 115° C. Seven g. of this amine was added to 4.7 g. of 4'-(sulfonyl-chloride)-phenylazo-2-naphthol in 100 ml. of pyridine under nitrogen. The mixture was allowed to stand overnight at room temperature. It was then heated on a steam cone for 30 minutes, then poured into 600 ml. of 10% HCl, filtered and then rinsed with water and a small amount of methanol. The resulting solid was next triturated with warm methylene chloride and filtered to yield 4.6 g. of a yellow solid, m.p. 138°–140° C., of the formula:

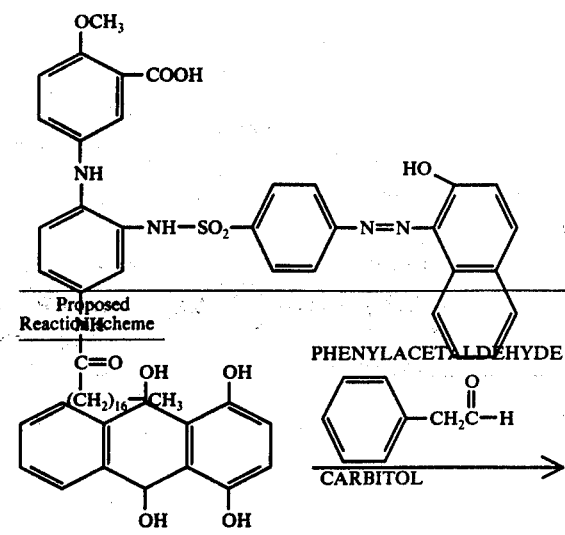

Proposed Reaction Scheme

LEUCOQUINIZARIN

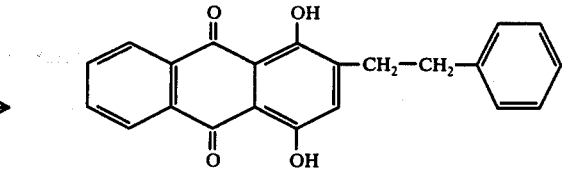

(MONOETHYL ETHER OF DIETHYLENE GLYCOL)

BENZYL TRIMETHYL AMMONIUM HYDROXIDE (40% SOLN. IN METHANOL)

Quantities:

| | |
|---|---|
| LEUCOQUINIZARIN | 112 gms. |
| PHENYLACETALDEHYDE | 63 gms. |
| CARBITOL | 400 mls. |
| BENZYL TRIMETHYL AMMONIUM HYDROXIDE | 17 mls. |

5.0 g. of the last-named compound was added to an unmeasured amount (about 60 ml.) of methylene chloride and 15 ml. of boron tribromide. The mixture was stirred overnight. The starting material went into solution as it complexed with the boron tribromide. The complex was decomposed with water, then triturated with hot water, methanol and hexane to yield 4.6 g. of the compound of formula 16, a yellow solid, m.p. 260° C.

The following example illustrates a preparation of a compound included with the scope of the present invention:

EXAMPLE 6

Step 1. Preparation of 2 phenethyl quinizarin.

Mix all of the above ingredients together except the trimethyl ammonium hydroxide and heat the mixture at about 85° C. until a solution is obtained. Then add the benzyl trimethyl ammonium hydroxide and heat at 90°–100° C. for six hours. Cool and filter and wash the filter cake first with methanol to remove the excess aldehyde and then with water to remove the carbitol. Dry the product thoroughly. Yield 107 gms. m.p. 138°–140° C.

Step 2. Synthesis of 1,4 dimethoxy 2 phenethyl anthraquinone.

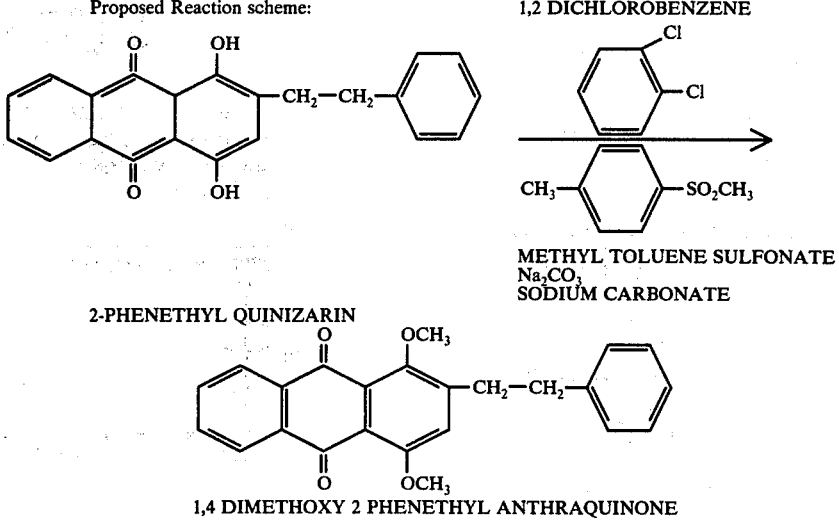

Quantities: (Initial)

| | |
|---|---|
| 2-PHENETHYL QUINIZARIN | 87.5 gms. |
| 1,2 DICHLOROBENZENE | 1250 mls. |

| | |
|---|---|
| -continued | |
| METHYL TOLUENE SULFONATE | 27.5 gms. |
| SODIUM CARBONATE | 125 gms. |

Reflux the ingredients for twenty-four hours and then add 25.5 additional gms. of methyl toluene sulfonate and 25 additional gms. of sodium carbonate and continue refluxing for about 25 hours. Filter and evaporate to an oil. Then triturate with ethyl ether to obtain an off yellow solid m.p. 100° C.

Step 3. Synthesis of 1,4 dimethoxy 2(4'chlorosulfonyl)anthraquinone.

Proposed Reaction scheme:

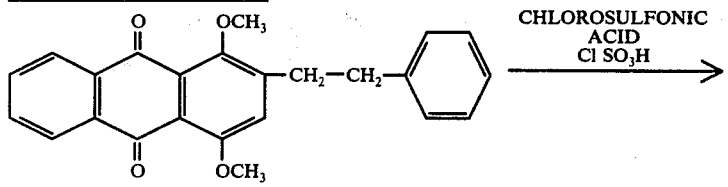

2 PHENETHYL 1,4 DIMETHOXY-ANTHRAQUINONE

-continued

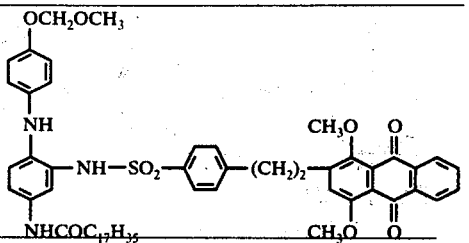

1,4 DIMETHOXY 2(4' CHLORO-SULFONYL) ANTHRAQUINONE

| Quantities: | |
|---|---|
| 2 PHENETHYL 1,4 DIMETHOXYANTHRAQUINONE | 6 gms. |
| CHLOROSULFONIC ACID | 48 gms. |

Dissolve the 2 phenethyl 1,4 dimethoxyanthraquinone in the chlorosulfonic acid under an atmosphere of dry nitrogen. Keep the reaction mixture chilled for about one-half hour and then stir at room temperature for three hours. Filter, dry and recrystallize from CCl$_4$ to obtain yellow crystals m.p. 170° C.

Step 4.

Proposed Reaction scheme:

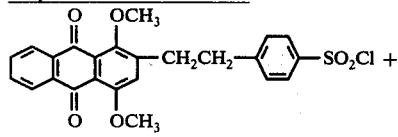

1,4 DIMETHOXY 2(4'-CHLOROSULFONYL) ANTHRAQUINONE

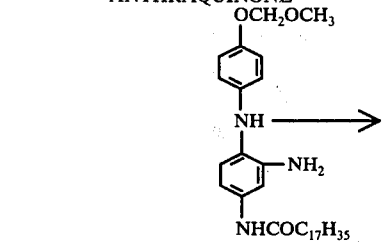

4-STEARAMIDO-2-AMINO-4'-METHOXY,METHOXY DIPHENYL-AMINE

| Quantities | |
|---|---|
| 1,4 DIMETHOXY 2(4'CHLOROSULFONYL) ANTHRAQUONONE | 3 gms. |
| 4-STEARAMIDO-2-AMINO-4-METHOXY, METHOXY DIPHENYLAMINE | 3.3 gms. |

Stir the reactants in pyridine overnight at room temperature and pour into water. Filter and rinse and dry the gummy filtrate which is then used directly in Step 5 as follows.

Proposed Reaction scheme:

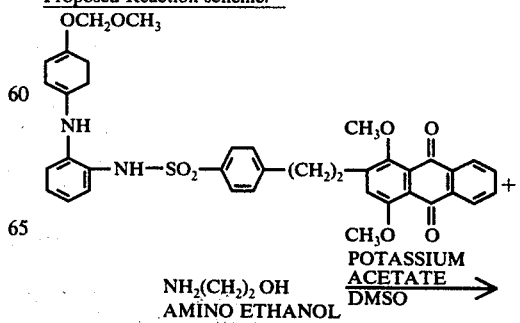

-continued

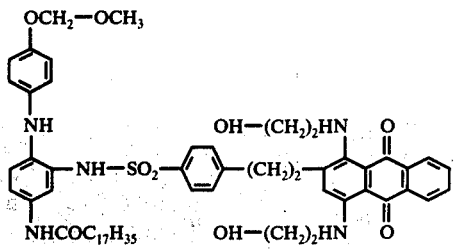

Quantities:
| | |
|---|---|
| PRODUCT OF STEP 4 | 6 gms. |
| AMINO ETHANOL | 6 mls. |
| POTASSIUM ACETATE | 8 gms. |
| DMSO | 50 mls. |

The solution containing the above ingredients was heated on a steam cone overnight and then precipitated in saline water, filtered, rinsed and dried. The product was isolated by chromotography using Fluorisil starting with 25% ethyl acetate in toluene, then 50% ethyl acetate and finally 100% ethyl acetate to remove the product m.p. 88°–90° C.

Analysis: $N_5O_9C_{58}H_{75}$

| | Calc. | Found |
|---|---|---|
| C | 68.9 | 68.36 |
| H | 7.42 | 7.31 |
| N | 6.88 | 6.93 |
| O | 14.14 | 13.38 |
| S | 3.1 | |

The —$OCH_2$—$OCH_3$ radical may be converted to the —OH radical in manners described in the foregoing examples.

The following examples illustrate the use of the compounds of this invention in the photographic systems described and claimed in the aforementioned application Ser. No. 655,440, now U.S. Pat. No. 3,443,940.

EXAMPLE 7

A first coating solution was prepared containing a mixture of 0.14 g. of the compound of formula 1, 0.2 g. of cellulose acetate hydrogen phthalate, 5.0 cc. of acetone and 7.0 cc. of methyl cellosolve. This solution was coated at room temperature at a rate of 10 feet per minute on a cellulose triacetate base which had been coated with 200 mg. per square foot of gelatin. After this coating had dried, a second coating solution was applied at the same rate containing 8.0 cc. of a standard light-sensitive silver iodobromide emulsion, 28.0 cc. of water, and 2.0 cc. of 1% aqueous "Triton X-100" (trademark of Rohm & Haas Co. for a nonionic isooctyl phenyl polyethoxy ethanol dispersing agent). This coating was made in the dark with the temperature of the coating solution kept at 40° C. The resulting photosensitive element was exposed for 1/100th of a second and the thus exposed element was then developed by spreading between this element and a superposed image-receiving element at a gap of 0.0036 inch, a processing composition comprising the following proportions of ingredients:

| | |
|---|---|
| Water | 100.0 cc. |
| Hydroxyethyl cellulose | 3.9 g. |
| Potassium hydroxide | 4.9 g. |
| ADAT (2-amino-5-N,N-diethylamino- | |
| toluene) | 2.0 g. |

The image-receiving element was prepared in accordance with the disclosure of the copending application of Edwin H. Land, Ser. No. 234,864, filed Nov. 1, 1962 now U.S. Pat. No. 3,362,819 and comprised a layer of a 2:1 mixture by weight of polyvinyl alcohol and poly-4-vinyl pyridine, a layer of polyvinyl alcohol, and a layer of a half-butyl ester of poly-(ethylene/maleic anhydride) coated on a baryta paper support. After an imbibition period of about three minutes, the image-receiving element was separated to reveal thereon a negative yellow-orange image.

EXAMPLE 8

Five cc. of a dispersion containing a 10:20:11 ratio, by weight, of the compound of formula 19, N,N-diethyl decanamide and gelatin, was mixed with 13 cc. of water, 5 cc. of a colloidal silver silver-precipitating agent mixture containing .08 g. of Ag/100 cc. of water, 2 cc. of 1% aqueous "Triton X-100" (trademark of Rohm & Haas Co., for a nonionic isooctyl phenyl polyethoxy ethanol dispersing agent), and 1 cc. of 5% aqueous ethanol. The resulting mixture was coated on a cellulose acetate support at 10 feet per minute at 40° C. After this coating had dried, a mixture of 4 cc. of a blue-sensitive silver iodobromide emulsion, 32 cc. of water and 2 cc. of 1% "Triton X-100" was coated thereover at the same speed and temperature to provide a photosensitive element The efficacy of a system using a photosensitive element prepared in the foregoing manner was first established by typical testing procedures wherein the ability of the color-providing material to transfer from unexposed areas was confirmed. In such testing procedures, no attempt is made to obtain an image and the unexposed element is imbibed with a processing composition containing no developer while in superposition with a dyeable stratum.

This unexposed element was imbibed with an aqueous alkaline processing composition containing no silver halide developer to establish that transfer could be effected in terms of unexposed areas. This was ascertained by spreading between the unexposed element and a superposed dyeable stratum at a gap of 0.0024 inch a composition comprising the following proportions of ingredients:

| | |
|---|---|
| Water | 100.0 cc. |
| Hydroxyethyl cellulose | 3.9 g. |
| Sodium hydroxide | 5.0 g. |
| Sodium thiosulfate | 4.0 g. |

Following an imbibition period of about two minutes, the respective elements were separated to reveal a uniform dense orange dye transfer image.

EXAMPLE 9

A photosensitive element similar to that prepared in the above example was prepared by coating onto a cellulose acetate support at a rate of 10 feet per minute a mixture containing 10 cc. of 2% cellulose acetate hydrogen phthalate in acetone, 3.5 cc. of the aqueous colloidal silver mixture in cellulose diacetate and 1.5 g. of the compound of formula 19; and thereafter coating onto the thus formed layer at the same rate a mixture containing 4.0 cc. of a panchromatic silver halide emulsion, 24.0 cc. of water and 1.0 cc. of 2% "Aerosol O.T." (trademark of American Cyanamid Co. for a wetting agent, dioctyl sodium sulfosuccinate). This photosensitive element was exposed and then developed by spreading between the thus exposed element and a superposed dyeable sheet material at a gap of 0.0024 inch a processing composition containing the following proportions of ingredients:

| | |
|---|---|
| Water | 100.0 cc. |
| Hydroxyethyl cellulose | 3.9 g. |
| Sodium hydroxide | 5.0 g. |
| Sodium thiosulfate | 2.0 g. |
| Triptycene diol | 1.0 g. |

After an imbibition period of about two minutes, the elements were separated to reveal a positive dye image.

The compounds of formulae (C) and (F), e.g., the illustrative compounds 9–31, may also be employed in the photographic systems described and claimed in the copending applications of Stanley M. Bloom and Robert K. Stephens, Ser. No. 655,501 filed July 24, 1967, now abandoned and Ser. No. 655,436 filed July 24, 1967 and now U.S. Pat. No. 3,443,939.

They may also be employed in the manner in which dyes have heretofore been employed, e.g., in the dyeing of fabrics, etc.

Since certain changes may be made in the above product without departing from the scope of the invention herein involved, it is intended that all matter contained in the above description shall be interpreted as illustrative and not in a limiting sense.

What is claimed is:
1. A compound of the formula

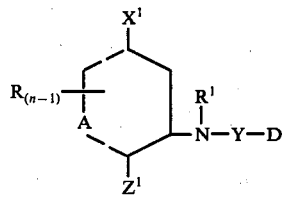

wherein:
A represents the atoms necessary to complete a benzene or naphthalene radical;
D is an anthraquinone dye moiety;
$Z^1$ is hydrogen or a substituent replaceable by an oxidized aromatic amino color developer in elimination-coupling reactions; said substituent being selected from the group consisting of chloro, bromo, carboxy, sulfo, hydroxy, alkoxy and hydroxyalkyl;
Y is the residue of an acid forming an amide with and reducing the basic character of the nitrogen atom to which it is bonded and is selected from the group consisting

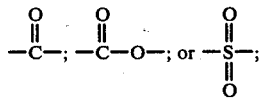

$X^1$ is hydroxy or a primary, secondary or tertiary amino of the formula

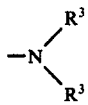

wherein each $R^3$ is hydrogen, alkyl, phenyl, naphthyl, or each $R^3$ may be alkylene so that the $R^3$'s together with the nitrogen atom provide a heterocyclic ring having 5 or 6 carbon atoms or each $R^3$ may be a lower alkyl having a substituent chosen from the group consisting of a hydroxy substituent, a methoxyethoxy substituent, a polyglycoloxy substituent, a carboxy substituent, an ethoxycarboxy substituent, a benzyl substituent, a phenyl substituent, a sulfo-phenyl substituent, an acetylaminophenyl substituent, a succinylaminophenyl substituent or a furane substituent;
R is an anchoring substituent rendering the compound non diffusible said substituent containing a higher alkyl radical bonded to a single carbon atom of said aromatic nucleus formed by said A moiety;
$R^1$ is hydrogen or alkyl; and
n is 2 or n may be 1 when $X^1$ is a secondary or tertiary amino comprising an anchoring moiety rendering said compound non diffusible or $R^1$ is an alkyl radical providing such an anchoring moiety.

2. A compound as defined in claim 1 wherein $R^1$ is hydrogen, and n is 2.

3. A compound as defined in claim 1 wherein R comprises a higher alkyl linked directly to said aromatic nucleus or indirectly through a —CONH— substituent.

4. A compound of the formula

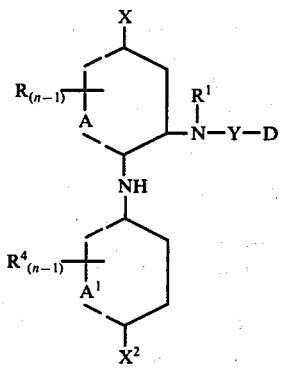

wherein:
each of A and $A^1$ represents the atoms necessary to complete a benzene or naphthalene radical;
D is an anthraquinone dye moiety;
Y is the residue of an acid forming an amide with and reducing the basic character of the nitrogen atom to which it is bonded and is selected from the group consisting

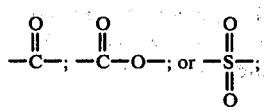

X and $X^2$ each is the substituent R, hydrogen, hydroxy, a primary, secondary or tertiary amino of the formula

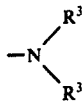

wherein each R³ is hydrogen, alkyl, phenyl, naphthyl, or each R³ may be alkylene so that the R³'s together with the nitrogen atom provide a heterocyclic ring having 5 or 6 carbon atoms or each R³ may be a lower alkyl having a substituent chosen from the group consisting of a hydroxy substituent, a methoxyethoxy substituent, a polyglycoloxy substituent, a carboxy substituent, an ethoxycarboxy substituent, a benzyl substituent, a phenyl substituent, a sulfo-phenyl substituent, an acetylaminophenyl substituent, a succinylaminophenyl substituent or a furane substituent provided that at least one of X and X² must be hydroxy or amino;

R and R⁴ each represent an anchoring substituent rendering the compound non diffusible, said substituent containing a higher alkyl radical bonded to a single carbon atom of said aromatic nucleus formed by said A or A¹ moieties respectively;

R¹ is hydrogen or alky; and $n$ and $n^1$ each is 1 or 2 and each $n$ and $n^1$ may be 1 when one X or X² is the substituent R or a secondary or tertiary amino comprising an anchoring moiety rendering the compound non diffusible or when R¹ is an alkyl substituent providing such an anchoring moiety but when said substituents do not contribute an anchoring moiety, at least one of $n$ and $n^1$ must be 2.

5. A compound as defined in claim 4 wherein each of R and R⁴ comprises a higher alkyl linked directly to said aromatic nucleus or indirectly through a —CONH— substituent.

6. A compound of the formula:

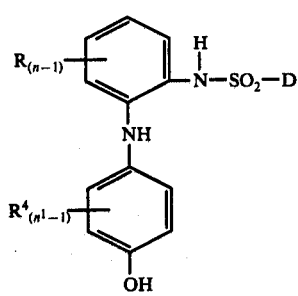

wherein:
each of R and R⁴ comprises an amide of at least 13 carbon atoms, said amide being bonded directly to a nuclear carbon atom of the shown benzene moiety or linked thereto through a phenylene or alkylene substituent;

each of $n$ and $n^1$ is 1 or 2 provided that at least one of said $n$ and $n^1$ is 2; and D is an anthraquinone dye moiety.

7. A compound of the formula:

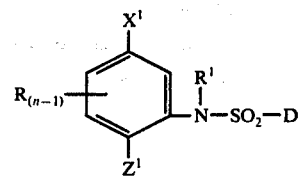

wherein:
D is an anthraquinone dye moiety;

Z¹ is hydrogen or a substituent replaceable by oxidized aromatic amino color developer in elimination-coupling reactions, said substituent being chloro, bromo, carboxy, sulfo, hydroxy, alkxoy or hydroxyalkyl;

R¹ is hydrogen or alkyl;

X¹ is hydroxy or amino;

R is an anchoring moiety which renders the compound nondiffusible and comprises a higher alkyl of at least 10 carbon atoms bonded to a nuclear carbon atom of the shown benzene moiety by a linking group which is —CONH—; and $n$ is 2.

8. A compound of the formula:

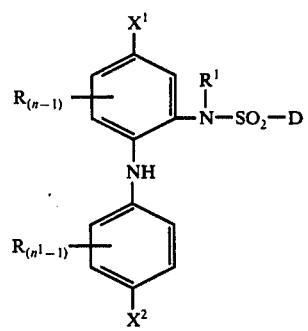

wherein:
D is an anthraquinone dye moiety;
R¹ is hydrogen;
one of X¹ or X² is hydroxy or amino and the other is hydrogen or the substituent R;

each R is an anchoring moiety rendering the compound nondiffusible and comprises a higher alkyl of at least 10 carbon atoms bonded to a nuclear carbon atom of the shown benzene moiety by a linking group which is —CONH—; and one of $n$ and $n^1$ is 2 and the other is 1 unless X¹ or X² is R, in which case both $n$ and $n^1$ are 1.

9. The compound:

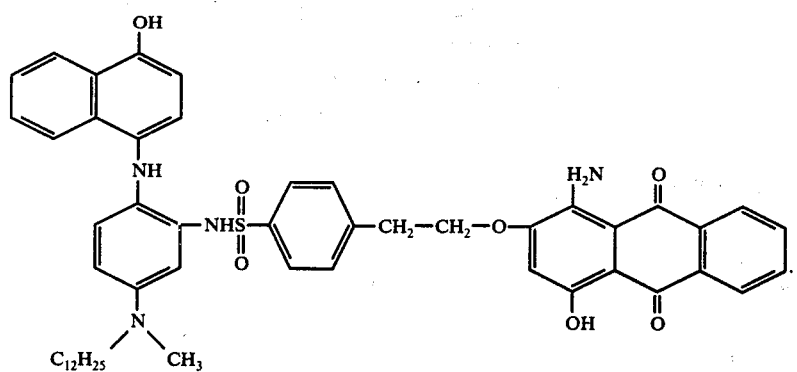
10. The compound:
11. The compound:
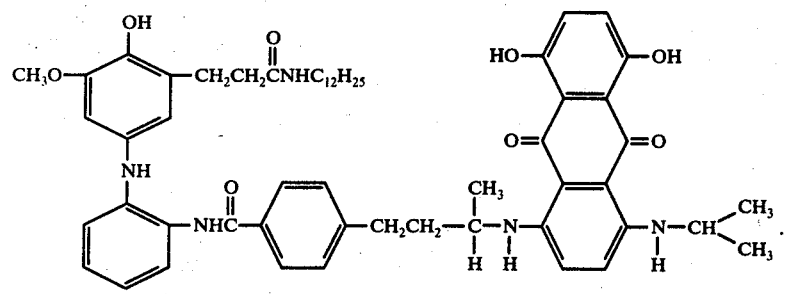
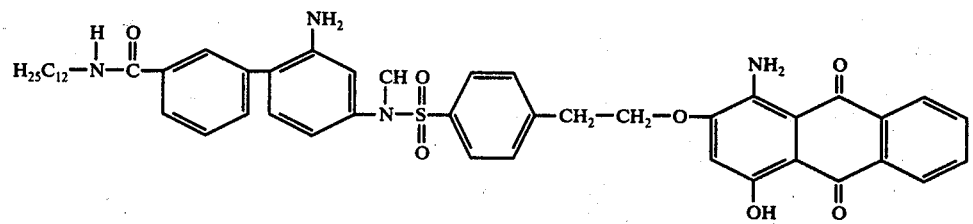
* * * * *